United States Patent [19]

Seo

[11] Patent Number: 5,383,030
[45] Date of Patent: Jan. 17, 1995

[54] MULTIPLE USE SYSTEM HAVING A LASER CARTRIDGE FOR A LASER PRINTER AND LASER FACSIMILE

[75] Inventor: Ho I. Seo, Ichon-Kun, Rep. of Korea

[73] Assignee: Hyundai Electronics Industries Co., Ltd., Kyoungkido, Rep. of Korea

[21] Appl. No.: 854,440

[22] Filed: Mar. 19, 1992

[30] Foreign Application Priority Data

Mar. 20, 1991 [KR] Rep. of Korea ............... 1991-4373

[51] Int. Cl.6 ..................... H04N 1/00; H04N 1/23
[52] U.S. Cl. ............................. 358/442; 358/444; 358/468; 358/296
[58] Field of Search ............... 358/296, 442, 468, 473, 358/401, 444, 300; 346/145; 355/202; 395/110, 112

[56] References Cited

U.S. PATENT DOCUMENTS

| | | | |
|---|---|---|---|
| 4,860,119 | 8/1989 | Maniwa et al. | 358/296 |
| 4,899,182 | 2/1990 | Inoue | 346/145 |
| 4,947,345 | 8/1990 | Paradise | 358/442 |
| 4,989,237 | 1/1991 | Kotani | 358/473 |

Primary Examiner—Scott A. Rogers
Attorney, Agent, or Firm—Darby & Darby

[57] ABSTRACT

This invention is to provide a laser facsimile system combining a laser printer and facsimile equipment, and the laser facsimile system comprises said laser printer 31 having a laser printer engine 33 and laser facsimile control part 32 for controlling a laser printer function and a facsimile function, a facsimile cartridge 36 connected to said laser facsimile control part 32, and an emulation cartridge 34 and a font cartridge 35 connected respectively to said laser facsimile control part 32.

7 Claims, 9 Drawing Sheets

MULTIPLE USE SYSTEM HAVING A LASER CARTRIDGE FOR A LASER PRINTER AND LASER FACSIMILE

BACKGROUND OF THE INVENTION

The present invention relates to a laser facsimile system combining a laser printer and a facsimile equipment.

Figure 1:
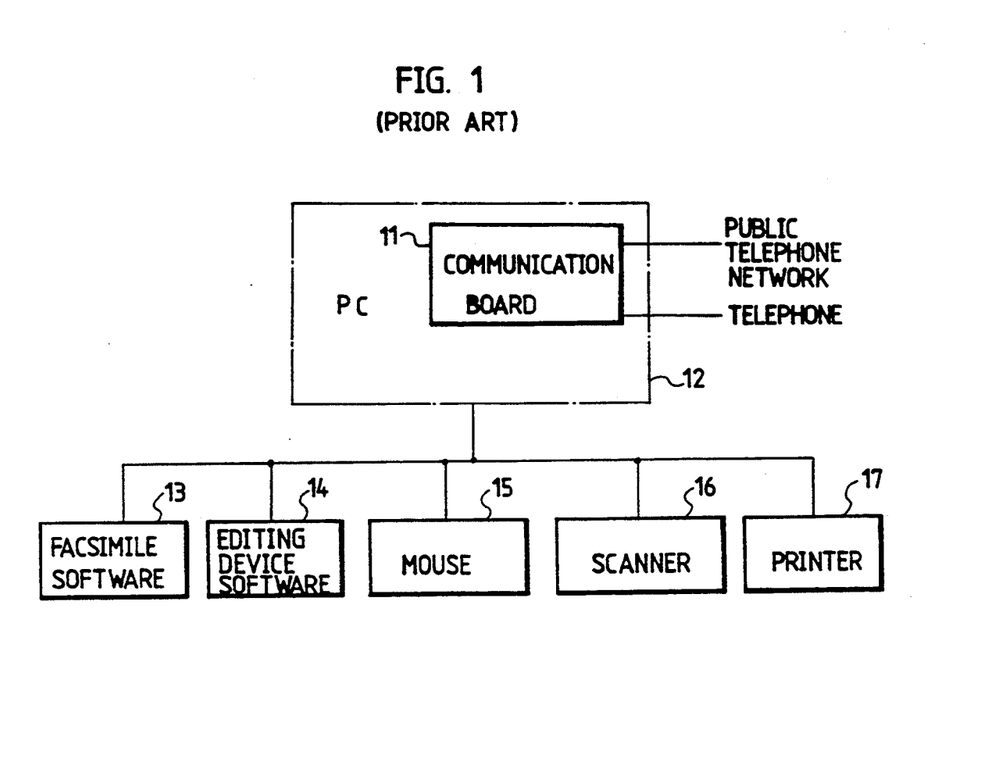
FIG. 1 and FIG. 2 are block diagrams for explaining the computer-facsimile system of the prior art.

Generally, the computer-facsimile (PC-FAX) system for transmitting accurately and rapidly a document to the other party has been used and the representative types of such system are described in detail with reference to FIG. 1 and FIG. 2. FIG. 1 is a block diagram of the internal type computer-facsimile system, and in FIG. 1, the reference number 11 shows an expanded computer-facsimile communication board, 12 a personal computer (hereinafter referred to as "PC"), 13 a facsimile application software block, 14 an editing software block, 15 a mouse, 16 a scanner, and 17 a printer, respectively. As shown in FIG. 1, the computer-facsimile system combines the data processing function of PC and the general facsimile function by mounting the board for communication on the expansion slot of PC, and is to perform facsimile communication with the other facsimile device by driving the application software for the facsimile in PC. Here, in case the computer-facsimile system used the general dot printer to print out a document, the printing output speed was delayed and the picture quality was bad. And when it used the laser printer, it sent again to the laser printer the generated document after receiving the document with using the board for communication, and so its communication procedure was complicated and inconvenient.

Figure 2:
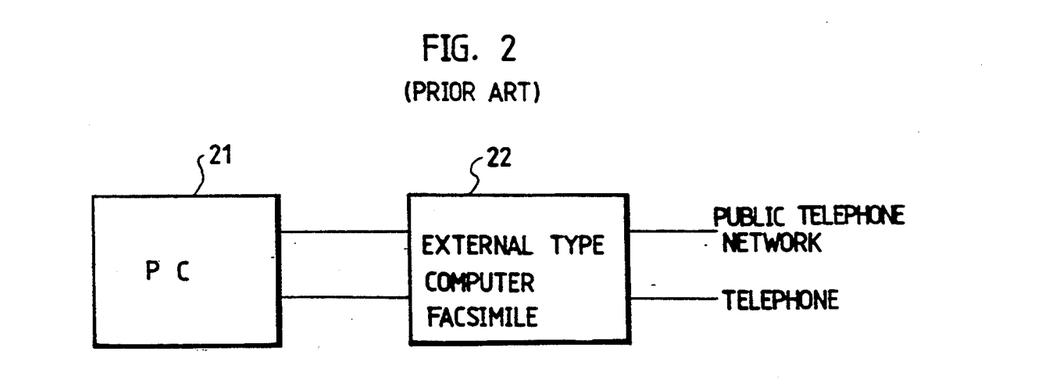

FIG. 2 is a block diagram of the PC-facsimile system, and in FIG. 2, 21 shows the PC and 22 the external type PC-facsimile, respectively.

The external type PC-facsimile system can be made up of the type that the facsimile file from PC is sent by the external device without using the scanner or the type that the general GIII facsimile function and RS-232C or centronics connection are possible. The latter type can be used as the general facsimile without connecting the PC 21, and in case of connecting the PC 21, it can edit and store the received document, and can send the processed document to the other facsimile device. Here, the external type PC-facsimile couldn't use the normal paper for document output and had a problem copying again the document by the copying machine in order to keep the document forever, and its document output procedure was very inconvenient and the picture quality was bad.

SUMMARY OF THE INVENTION

It is an object to provide a laser facsimile system combining a laser printer and facsimile equipment, which can be used as laser printer in the normal state and also can be used as facsimile equipment after mode conversion, and which uses normal paper in printing out the document and improves its picture quality.

To achieve said object, the present invention provides a laser facsimile system combining a laser printer and a facsimile equipment, comprising: said laser printer having a laser printer engine and laser facsimile control means, for controlling a laser printer function and a facsimile function; facsimile cartridge means connected to said laser facsimile control means, for performing the facsimile function; and emulation cartridge means and font cartridge means connected respectively to said laser facsimile control means in parallel with said facsimile cartridge means.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 3:
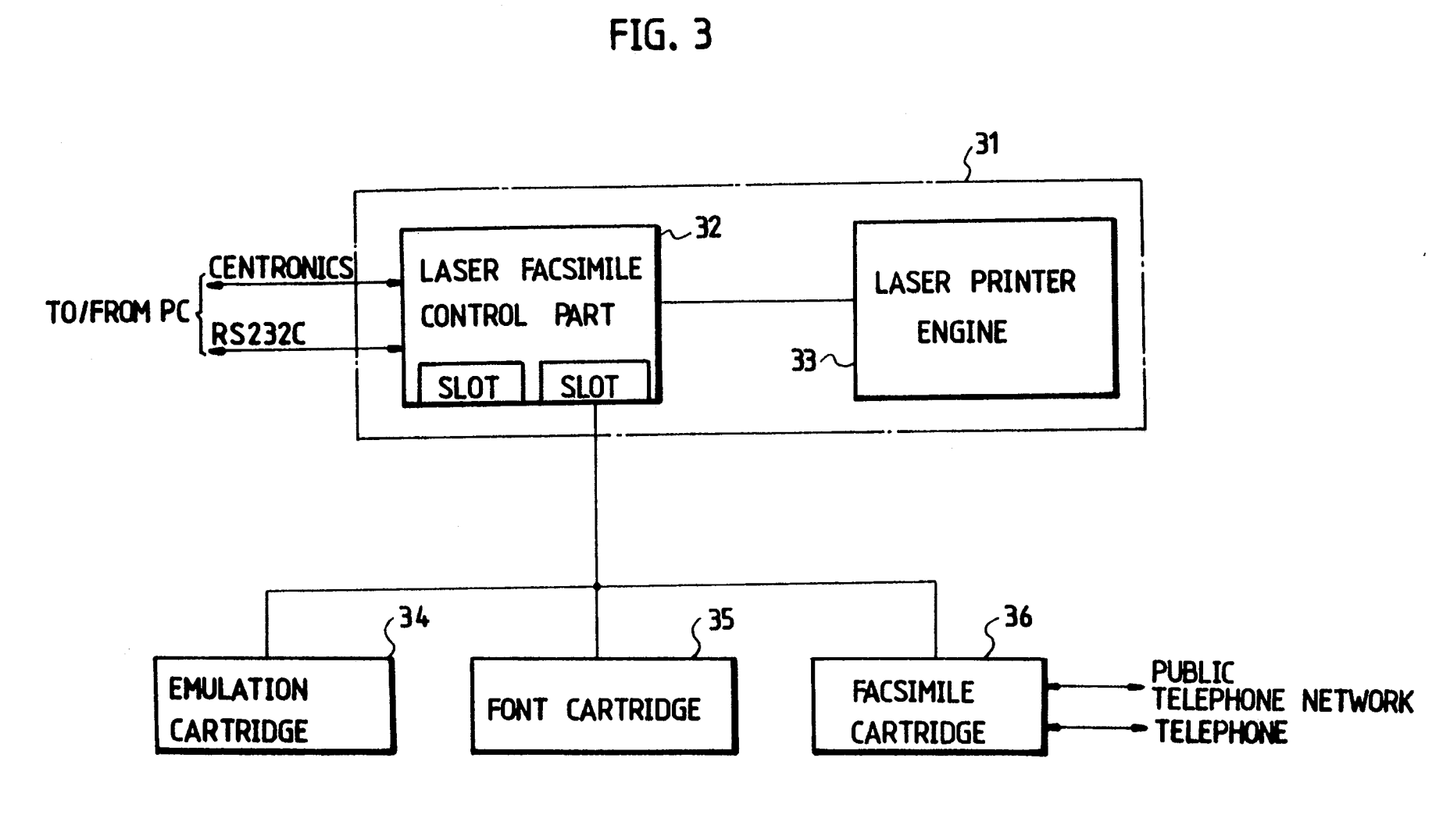
FIG. 3 is a block diagram of this invention.

FIG. 3 is a block diagram of the invention, and in FIG. 3, the reference number 31 shows a laser printer system, 32 a laser facsimile control part, 33 a laser printer engine, 34 emulation cartridges, 35 font cartridges, and 36 a facsimile cartridge, respectively.

The laser facsimile control part 32 comprises a CPU(-Central Processing Unit) and logic parts for interfacing with the facsimile equipment, for controlling the overall functions of the invention.

The facsimile cartridge 36 is connected to the slot of the laser facsimile control part 32, for performing the general facsimile functions.

As shown in FIG. 3, the invention is to implement the laser facsimile system by adding the facsimile control part 32 and the facsimile cartridge 36 in the laser printer. Here, the invention in this embodiment also uses the general emulation cartridge 34 and font cartridge 35.

Figure 4:
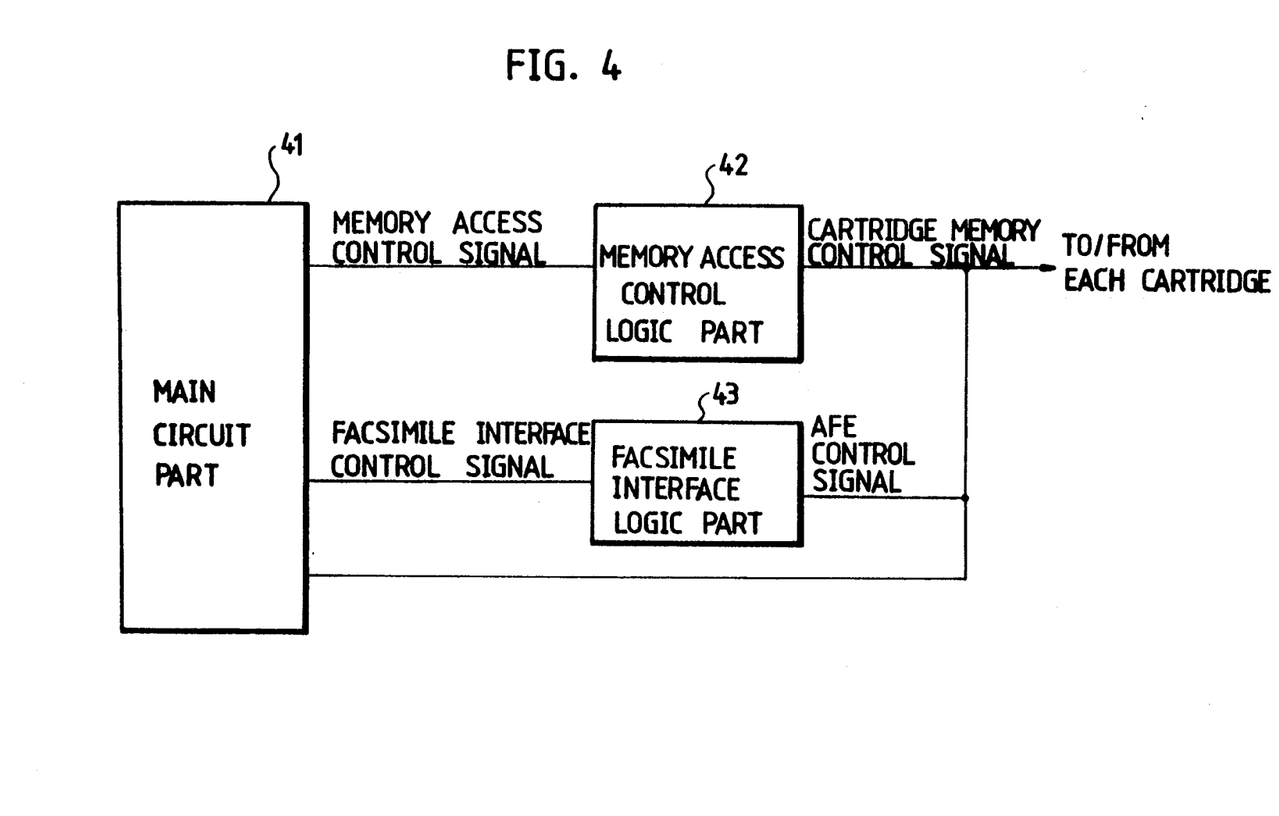
FIG. 4 is a block diagram of the laser facsimile control part.

FIG. 4 is a construction diagram of the laser facsimile control part 32, and in FIG. 4, the reference number 41 shows a main circuit part, 42 a memory access control logic part, and 43 a facsimile interface logic part, respectively. As shown in FIG. 4, the laser printer, the memory access control logic part 42 is connected to the main circuit part 41, for being compatible with various emulation and font cartridges, and the facsimile interface part 43 is connected to the main circuit part 41 and implemented to be capable of using the same slot with the memory access control logic part.

The main circuit part 41 controls the memory access control logic part 42 by applying a memory access control signal. The memory access control signal is the signal for controlling the memory access control logic part 42 in order to use the memory variously. And also, the main circuit part 41 outputs a facsimile interface control signal for interfacing with the facsimile interface logic part 43.

The memory access control logic part 42 performs the predetermined functions without respect to the kinds of cartridges, and inputs the memory access control signal and outputs a cartridge memory control signal. The cartridge memory control signal is the cartridge related control signal for selecting a cartridge and upper/lower byte of the cartridge memory.

The facsimile interface logic part 43 generates the control signals necessary to control an AFE (Analog Front End) IC within the facsimile cartridge 36, and processes various interrupts received from the external devices.

Figure 5:
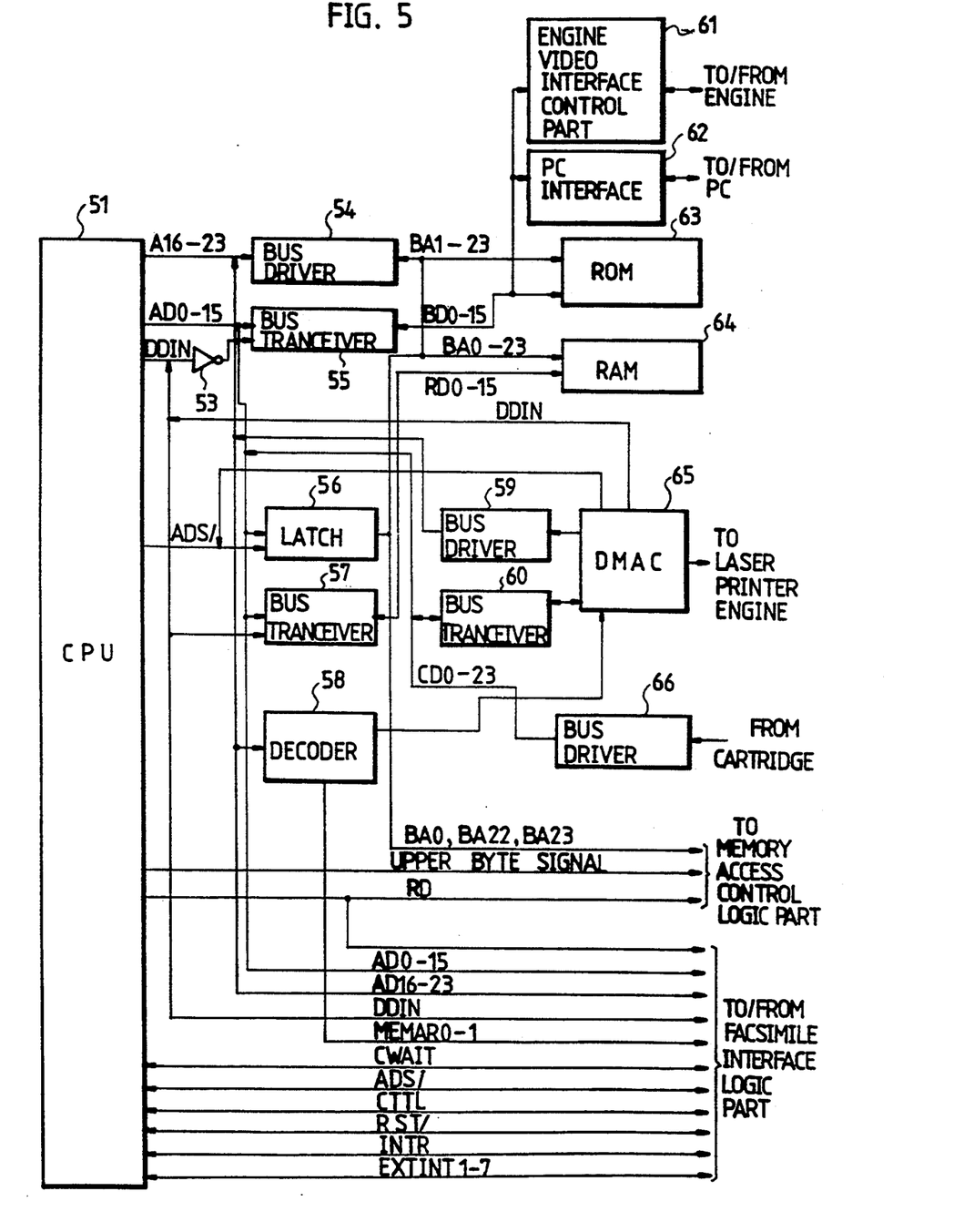
FIG. 5 is a schematic construction diagram of the main circuit part.

FIG. 5 is a schematic diagram of the main circuit part 41, and in FIG. 5, the reference number 51 shows a CPU, 53 an inverter, 54, 59 and 66 bus drivers, 55, 57 and 60 bus transceivers, 56 a latch part, 58 a decoder, 61 an engine video interface control part, 62 a PC interface part, 63 a ROM, 64 a RAM, and 65 a direct memory access control part (hereinafter referred to as DMAC), respectively.

As shown in FIG. 5, the main circuit part 41 comprises the CPU 51, the first, second and third bus drivers 54, 59 and 66 connected to the CPU 51, the latch part 56, the decoder 58, the first, second and third bus transceivers 55, 57 and 60, the engine video interface control part 61 connected to the first bus transceiver 55, for controlling video image input and output to/from the laser printer engine 33, the PC interface part 62 connected to the first bus transceiver 55, for transmitting serial or parallel data to the CPU 51 after storing temporarily said data in the queue memory thereof according to the procedure of serial or parallel control signal with the PC 21, the first bus driver 54, the ROM 63 connected to the first bus transceiver 55 and the latch part 56, the RAM 64 connected to the second bus transceiver 57 and the latch part 56, and the DMAC 65 connected to the decoder 58, the latch part 58, the bus transceiver 60, the second bus driver 59 and the CPU 51.

If the serial, parallel control signals and the data are inputted through the PC interface part 62 and also the emulation codes or the protocol codes for interfacing with the PC are inputted, the control codes of the translator software in ROM 63 and the bit image formed by video data processing function are formed in the video buffer memory of the RAM 64. If the CPU 51 outputs said bit image under the print output mode, the CPU 51 selects the DMAC 65 by the decoder 58 and outputs that to the laser printer engine 33 according to the interface signal procedure of the engine video interface control part 61 after letting the DMAC 65 access the video image data formed in the video buffer memory of the RAM 64 and performing the parallel to serial data conversion.

In case that the emulation codes or the protocol codes are inputted and the contents of the codes are translated as the command converting the video image formed within the video memory buffer of the RAM 64 to the facsimile file, the CPU 51 compresses the video bit image as the facsimile reference according to T.30 and T.4 facsimile protocols, and Group II or Group III modem protocol stored in the ROM device formed within the facsimile cartridge 36, and then outputs that to the AFE IC of the facsimile cartridge 36 according to the reciprocal procedure with the facsimile interface logic part 43.

Accordingly, the data sent to the facsimile cartridge 36 are transmitted to the remote facsimile equipment after performing the digital to analog conversion in the inside thereof.

Here, the T.30 protocol shows the facsimile interface (Hand Shake) protocol and the T.4 protocol shows the facsimile image compression and decompression protocol.

If the laser facsimile system is under the standby state or the ring signal is inputted from the external telephone network in the middle of performing the print output, the facsimile cartridge 36 sends an interrupt signal to the CPU 51 and the CPU 51 is changed to the facsimile mode. And then the CPU 51 sends the BUSY signal to the PC 21 and prevents that more control codes and data are inputted from the PC 21. In this procedure, if the remnant print output pages exist in the video image buffer memory in the state that the print output procedure is not ended as the print mode, the performing operation is different according to the RAM 64 and the size of extended memory.

At this time, the CPU 51 stores temporarily the facsimile data, and converts the facsimile data to the video image data according to said facsimile protocol, and prints out the bit image data within the facsimile video image buffer after printing out one page document in the middle of printing out. If the remnant system memory for forming an image exists in the facsimile video image buffer, the video image data conversion, the image forming procedure and the print output procedure are made at the same time by the time sharing method.

However, if the remnant system memory doesn't exist, the video memory stored as bit image in advance in the video image buffer is eliminated and the facsimile data is converted to the image data according to the facsimile protocol by using said video memory.

On the other hands, in case of transmitting the facsimile file to the other party, the video memory is processed as image, and also in case that the ring signal is received and the receiving mode is set, in the middle of said course, said process steps are made.

The data inputted by said process steps are compressed and decompressed according to the facsimile and modem protocol, and are formed as images on the image buffer memory. The video images formed on the image buffer memory are printed out on the normal paper through DMAC 65 and the signal procedure of the engine video interface control part 61. And also according to the requirement of the PC 21, the transmission to the PC 21 as bit image file through the PC interface part 62 is possible.

The bus driver 54 is for buffering the address lines connected to the ROM 63, and this buffering is for separating other external signals and for supplying the current to the ROM 63 in order to drive the ROM 63.

The bus driver 59 is for buffering the address lines connected to one output terminal of the DMAC 65, and the bus driver 66 performs the function separating the data signal inputted from the cartridge from the other bus signals.

The bus transceiver 60 sends the control data to the DMAC 65 and controls the DMA (Direct Memory Access) inputted to the video image buffer memory within the RAM 64.

When the DMAC 65 sends the address to the RAM 64, the address strobe signal (ADS) and the data direction control signal (DDIN) are outputted in the same time.

The bus transceiver 55 controls input/output of the data signal to the ROM 63, the engine video interface control part 61 and the PC interface part 62, etc., and the bus transceiver 57 performs the buffering and control function for input/output of the data to the RAM 64.

The latch part 56 latches the address and provides it to the ROM 63 and the RAM 64, and if the address strobe signal (ADS) is inputted, it latches the address signal until the rising edge of the next signal is inputted.

The DMAC 65 inputs in parallel the video data of the video image buffer memory within the RAM 65, and outputs in serial the video data to the laser printer engine. And also it sends the corresponding address to the video image buffer memory through the bus driver 59 and the bus transceiver 60 to access the video data formed as image in the video image buffer memory by the CPU 51 in advance. At this time, the DMAC 65 outputs the data direction control signal (DDIN) and the address strobe signal (ADS) as 'low' state, and the bus transceiver 55 sends the data to the DMAC 65. The data direction control signal is outputted to the bus transceiver 55 through the inverter 53 to prevent the output of the data from the ROM 63. Said method that the DMAC 65 accesses the video image buffer memory is applied also in case that the facsimile interface logic part 43 sends the facsimile data file outside. That is, the facsimile interface logic part 43 sends out the data direction control signal (DDIN) and the address strobe signal (ADS) as 'low' state to the bus transceiver 57 and the latch part 56 and the facsimile data file which shall be transmitted, from the video image buffer memory. In case of receiving the facsimile data file from the external device, the DDIN signal is outputted as 'high' state, the ADS signal is outputted as 'low' state, and then the data from the facsimile interface logic part 43 are transmitted to the RAM 64.

The decoder 58 outputs the selection signal selecting an input/output device, DMAC 65, the facsimile interface logic part 43, etc.

In the FIG. 5, the 'CWAIT' signal is the standby signal transmitted to the CPU 51 in case that the facsimile cartridge 36 is under the busy state, the 'CTTL' signal is the system clock necessary to the facsimile interface logic part 43, the 'MEMAR 0-1' is the signal indicating whether the CPU 51 accesses a memory, the 'RST' is the reset signal, the 'INTR' is the interrupt requiring signal, and the 'EXTINT 1-7' is the interrupt requiring signal having a priority for mask from the external.

Figure 6:
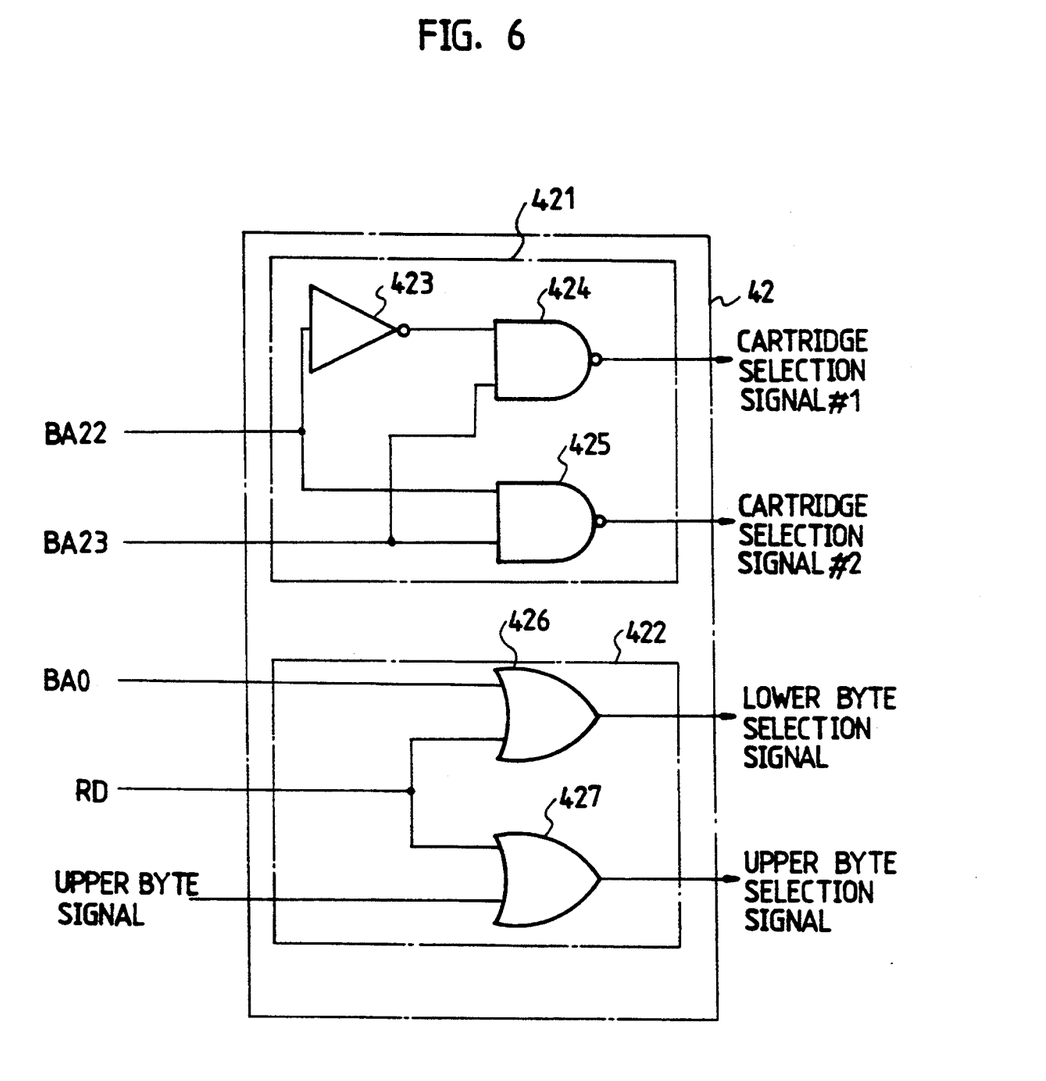
FIG. 6 is a schematic construction diagram of the memory access control logic part.

FIG. 6 is a construction diagram of the memory access control logic part, and in FIG. 6, the reference number 421 shows a cartridge selection signal processing part, 422 an upper/lower byte selection signal processing part, 423 an inverter, 424 and 425 NAND gates, and 426 and 427 OR gates, respectively.

As shown in FIG. 6, the memory access control logic part 42 of this embodiment comprises the inverter 423 inverting the address signal (BA22), the NAND gate 424 for inputting the output of the inverter 423 and the address signal (BA23) and outputting the cartridge selection signal (#1), the NAND gate 425 for inputting said two address signals (BA22 and BA23) and outputting the cartridge selection signal (#2), the OR gate 426 for inputting the address signal (BA0) and the read signal (RD) and outputting the lower byte selection signal, and the OR gate 427 for inputting the read signal (RD) and the upper byte signal from the main circuit part 41 and outputting the upper byte selection signal.

Here, the cartridge selection signal processing part 421 is made up of the inverter 423, the NAND gate 424 and the NAND gate 425, and also can be made up of I/O decoder gate.

The memory access control logic part 42 has the construction for accessing various cartridges 35, 36 and 37, and inputs the address signal, the read signal and the upper byte signal from the main circuit part 41 and outputs the upper byte selection signal, the lower byte selection signal and the cartridge selection signal to the cartridges by selecting the word access (read 16 bits) and the byte access (read 8 bits) according to said signal characteristics.

The byte access can be selected as odd byte or even byte. The operation is explained below with reference to the following table 1.

TABLE 1

| | INPUT/OUTPUT | | | | |
|---|---|---|---|---|---|
| | INPUT SIGNAL | | | OUTPUT SIGNAL | |
| MEMORY ACCESS | BA0 | RD | UPPER BYTE SELECTION SIGNAL | UPPER BYTE SELECTION SIGNAL | LOWER BYTE SELECTION SIGNAL |
| WORD ACCESS | 1 | 1 | 1 | 1 | 1 |
| BYTE ACCESS | | | | | |
| EVEN BYTE ACCESS | 1 | 1 | 0 | 0 | 1 |
| ODD BYTE ACCESS | 0 | 1 | 1 | 1 | 0 |

The memory access control logic part 42 selects the word access and sends out the upper and the lower byte selection signals as logic "1" to the cartridge, in case that the address signal (BA0) is logic "1", the upper byte signal is logic "1" and the read signal (RD) is logic "1". The memory access control logic part 42 selects the even byte access and sends out the upper byte selection signal of logic "0" and the lower byte selection signal of logic "1" to the cartridge, in case that the address signal (BA0) is logic "1", the upper byte signal is logic "0" and the read signal is logic "1". And the memory access control logic part 42 selects the odd byte access and sends out the upper byte selection signal of logic "1" and the lower byte selection signal of logic "0" to the cartridge in case that the address signal (BA0) is logic "0", the upper byte signal is logic "1" and the read signal is logic "1".

The address signals BA23 and BA22 are signals for selecting the cartridges (#1 and #2). In case that the address signals BA23 and BA22 are logic "1" and logic "0" respectively, the address area is selected from the address 800000 to BFFFFF and the cartridge selection signal (#1) is set as low state (logic "1"), and in case that the signals BA23 and BA22 are logic "1" respectively, the address area is selected from C00000 to FFFFFF and the cartridge selection signal (#2) is set as low state (logic "1"). That the read signal (RD), the upper byte signal, the upper byte selection signal and the lower byte selection signal are respectively low state corresponds to that the read signal, the upper byte signal, the upper byte selection signal and the lower byte selection signal are respectively logic "1" in Table 1. In the same way as this, logic "0" shows high state in Table 1.

Figure 7:
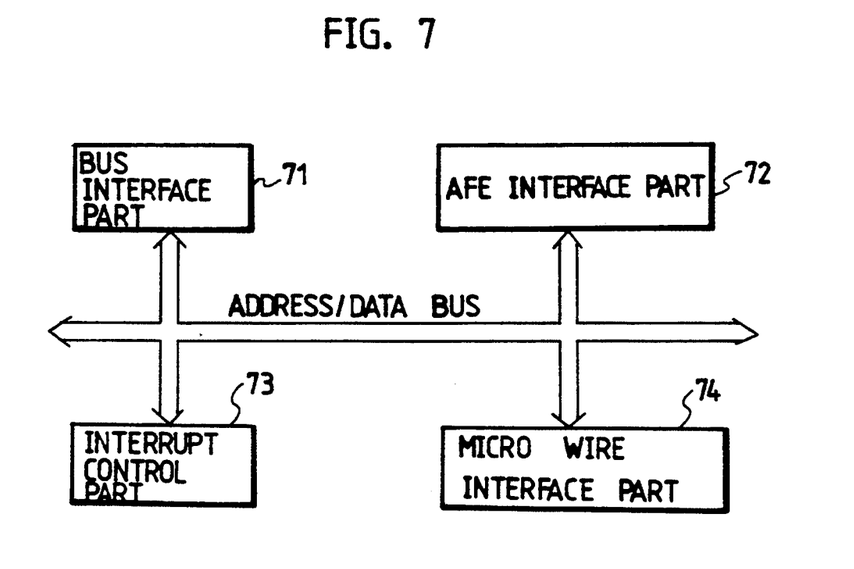
FIG. 7 is a schematic construction diagram of the facsimile interface logic part.

FIG. 7 is a construction diagram of the facsimile interface logic part, and in FIG. 7, the reference number 71 shows a bus interface part, 72 an AFE interface part, 73 an interrupt control part, and 74 a micro wire interface part, respectively.

The AFE interface part 72 is logic part for interfacing with the AFE IC mounted in the facsimile cartridge 36, and inputs and outputs signals to and from the AFE IC.

The interrupt control part 73 performs the function for sending interrupt signals to the CPU 51 according to priority for interrupt requirement.

The micro wire interface part 74 performs the serial communication with the AFE IC and in this embodiment the micro communication protocol of National Semiconductor Company is used.

The bus interface part 71 controls the address/data bus to enable the interface between said parts 72, 73 and 74 and the CPU 51.

Figure 8:
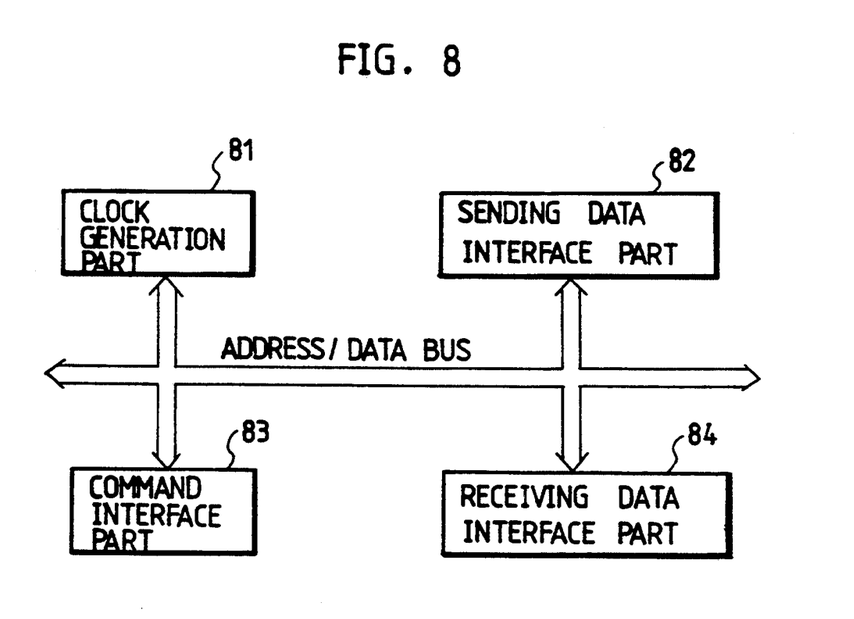
FIG. 8 is a schematic construction diagram of the analog front end interface part.

FIG. 8 is a construction diagram of the AFE interface part 72, and in FIG. 8, the reference number 81 a clock generation part, 82 a sending data interface part, 83 a command interface part and 84 a receiving data interface part, respectively.

The clock generation part 81 generates the clock necessary to the AFE IC by software control. The sending data interface part 82 is made up of twelve 8 bit parallel/serial FIFO (First-In First-Out) registers, and is programmable for generating the sending buffer interrupt. The receiving data interface part 84 is made up of twelve 8 bit parallel/serial FIFO registers and is programmable for generating the receiving buffer interrupt. The command interface part 83 is logic part for controlling serial/parallel interface for enabling read/write.

Figure 9:
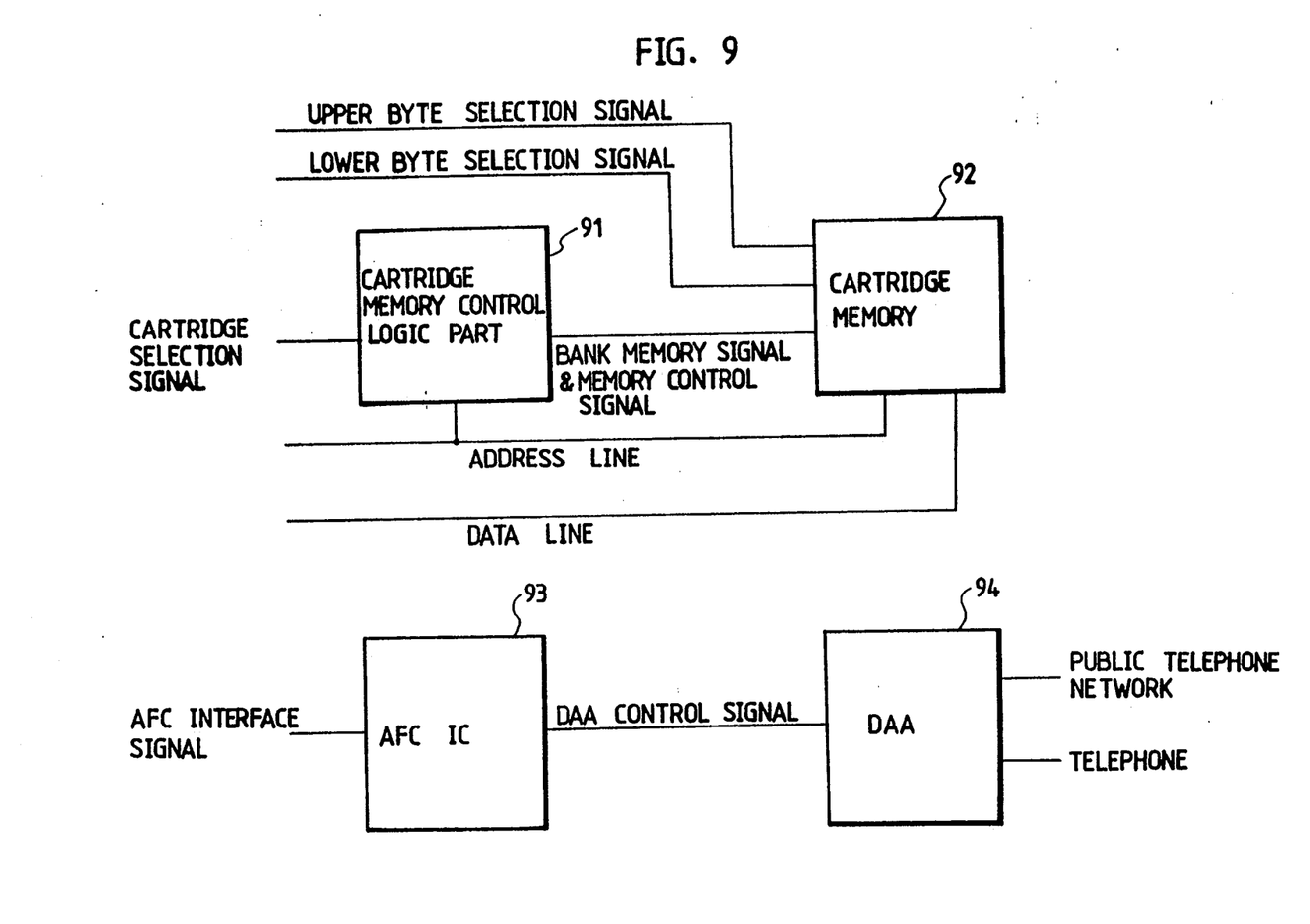
FIG. 9 is a block diagram of the facsimile cartridge.

FIG. 9 is a construction diagram of the facsimile cartridge 36, and in FIG. 9, the reference number 91 shows a cartridge memory control logic part, 92 a cartridge memory, 93 an AFE IC and 94 a data access arrangement (hereinafter referred to as 'DAA'), respectively.

The cartridge memory control logic part 91 is logic part for accessing various cartridge memories, and in case that the cartridge selection signal inputted to the cartridge is logic "1" (low level), it is possible to access the corresponding memory bank according to the address line selection. The bank memory signal is outputted to the cartridge memory 92 in order to read memory area or memory device group corresponding to the selected bank of the cartridge memory.

The cartridge memory 92 has the software program related to T.30 protocol, T.4 image compression/decompression and facsimile modem.

The AFE IC 93 is IC for facsimile modem and inputs/outputs an analog signal of 9600 bps to/from DAA 94, and in this embodiment, NS 32 FX 210 IC of National Semiconductor Company is used. The DAA 94 performs the function for interfacing with the public telephone network and AFE 93, and includes a ring detection circuit. The analog sending/receiving signals outputted from the AFE IC 93 are converted to 600 [ohm] connection by DAA 94 according to the characteristics of the public telephone network.

Figure 10:
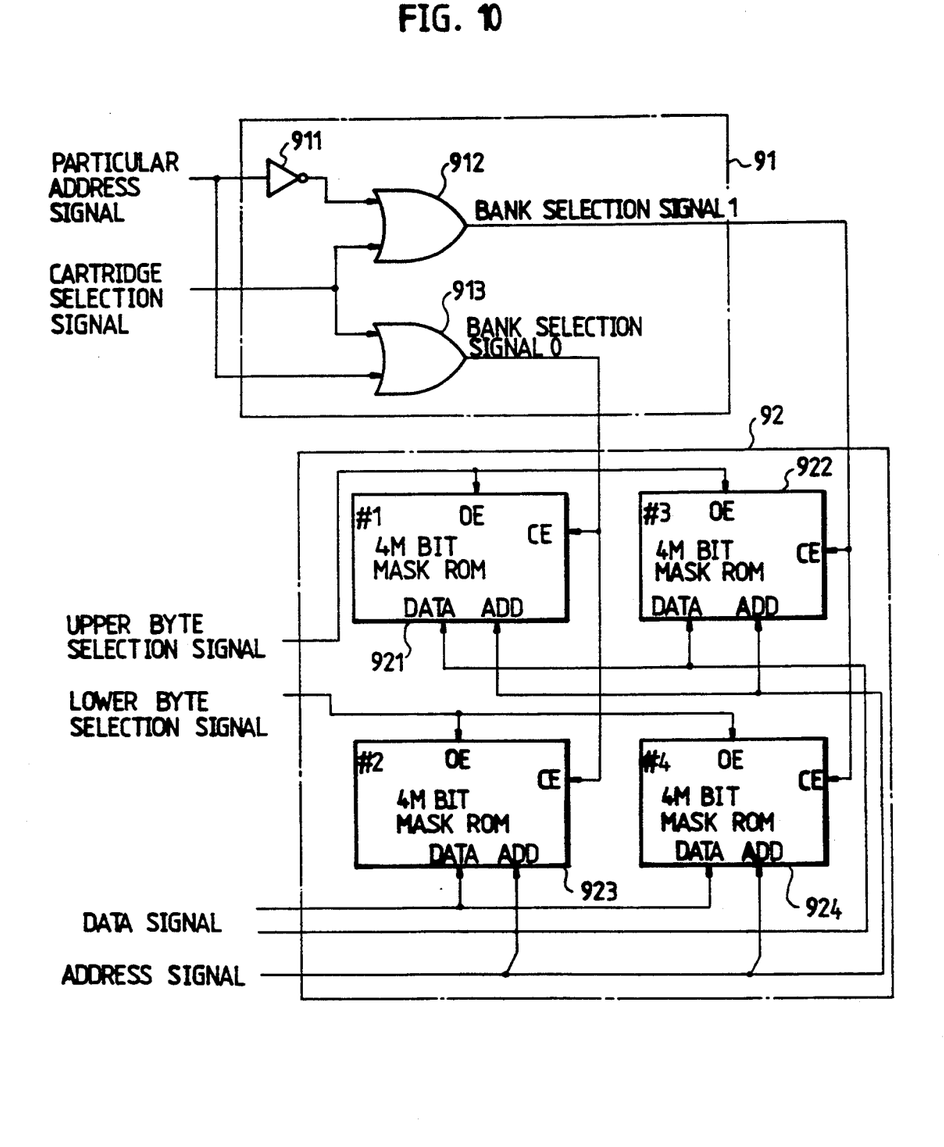
FIG. 10 is a schematic construction diagram of the cartridge memory control logic part and the cartridge memory.

FIG. 10 is a construction diagram of the cartridge memory control logic part and the cartridge memory.

As shown in FIG. 10, the cartridge memory control part 91 comprises an inverter 911 inverting a particular address signal, an OR gate 912 inputting an output of the inverter 911 and the cartridge selection signal and deciding the bank selection signal (#1), and an OR gate 913 inputting the particular address signal and the cartridge selection signal and deciding the bank selection signal 0. The upper byte selection signal and the lower byte selection signal is inputted to 4M (Mega) bit mask ROM of the cartridge memory 92. The particular address signal is the signal for selecting a bank. When the particular address signal is low state and the cartridge selection signal is low state, the bank selection signal 0 becomes low state (logic 1) and then is inputted to the CE terminals of the 4M bit mask ROM's 921 and 923. When the particular address signal is high state and the cartridge selection signal is low, the bank selection signal 1 is selected as low level (logic 1) and is inputted to the CE terminals of the 4M bit mask ROM's 922 AND 924.

Figure 11:
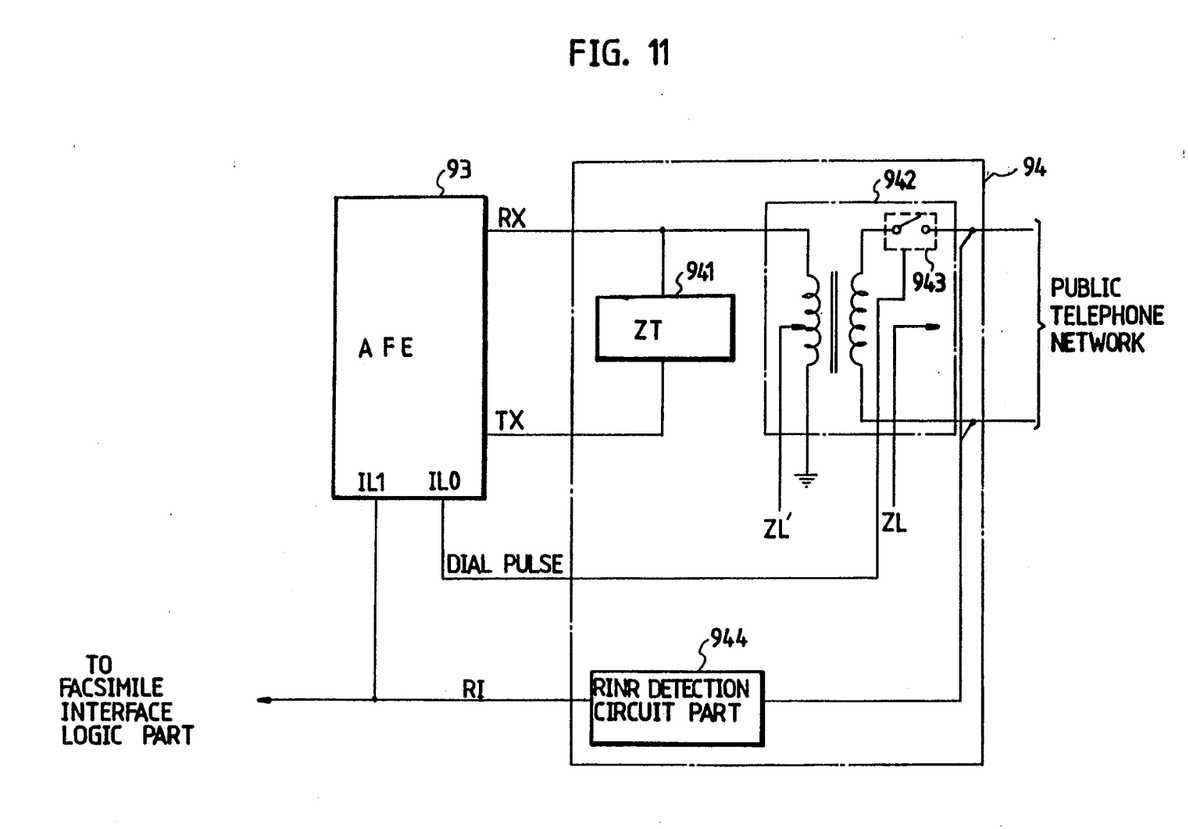
FIG. 11 is a schematic construction diagram of the data access arrangement part.

FIG. 11 is a construction diagram of the DAA 94, and in FIG. 11, the reference number 941 shows a transmission impedance, 942 a transformer, 943 a relay switch, and 944 a ring detection circuit part, respectively.

The transmission impedance is decided reciprocally with the line side impedance (ZL) and generally the impedance (ZL) is 600 [ohm]. Therefore, the transformer 942 performs the function for matching the line impedance.

When transmitting the facsimile file, the AFE IC 93 stores the dial codes in the internal register thereof by the micro wire protocol. After that, the relay switch 943 is driven by the dial pulse generated in the output mode (IL0) and the dial pulse is outputted to the line by hook off/on procedure, or DTMF dial signal is outputted to the other party by DTMF method and auto dial function is performed.

On the other hands, if a response signal is received from the other party, the line is connected by modem protocol according to the facsimile file transmission procedure, and then the modem signal converted to analog signal is outputted through TX terminal. If a ring signal is received from the line, the ring detection circuit part 944 outputs 'RI' signal to the AFE 93 and the facsimile interface logic part 43.

If the CPU 51 of the main circuit part 41 receives an interrupt signal by the facsimile interface logic part 43, the CPU 51 sets the internal mode to the facsimile receiving mode, and then makes the relay to the hook off state through the AFE IC 93.

After a response tone due to modem rule is outputted to the other party and the line is connected to the other party by the modem protocol, an analog receiving data are received through the receiving line terminal (RX).

What is claimed is:

1. A multiple use system for laser printing and laser facsimile printing, comprising:
   main control means for performing data transformation between video image data and facsimile file format, accessing a cartridge memory and processing a plurality of interrupt signals;

first and second slot means for receiving any one of a facsimile cartridge, a font cartridge or an emulation cartridge such that said facsimile cartridge may be connected in parallel to said main control means with another of said cartridges;

memory access control means connected to said main control means, for selecting one of said cartridges received in one of said slot means and controlling said accessing of the cartridge memory;

facsimile interface means connected to said main control means, for controlling a facsimile cartridge and processing a plurality of interrupt signals;

a laser printer engine means connected to said main control means for printing image data;

wherein said facsimile cartridge comprises:

cartridge memory control means for receiving a cartridge selection signal and address signal from said facsimile interface means and outputting a memory control signal and a bank memory signal;

cartridge memory means connected to said cartridge memory control means, for supplying facsimile modem software and a software related to T.4 image compression/decompression and a T.30 protocol;

front end means for processing an analog signal from the facsimile equipment and an analog signal of 9600 bps;

and data access arrangement means for interfacing a public telephone network with said front end means and for detecting a ring signal.

2. A multiple use system according to claim 1, wherein said main control means comprises:

CPU means for digital signal processing;

engine video interface control means connected to said CPU means, for controlling said laser printer engine and video image input/output;

personal computer interface means connected to said CPU means, for receiving data from the personal computer, storing data temporarily in an internal queue memory, and then outputting the data to said CPU means;

latch means, connected to said CPU means for latching an address signal according to an address strobe signal;

memory means connected to said CPU means and said latch means for storing image data;

decoding means, connected to said CPU means for decoding coded image data; and a direct memory access controller connected to said CPU means, said latch means and said decoding means, for processing video image data stored within said memory means.

3. A multiple use system according to claim 2, wherein said memory access control means comprises:

an inverter means for inverting a particular address signal;

first NAND gate means for receiving the output of said inverter and a first address signal and outputting a first cartridge selection signal;

second NAND gate means for receiving said first address signal and a second address signal and outputting a second cartridge selection signal;

first OR gate means for receiving a third address signal and a read signal and outputting a lower byte selection signal; and second OR gate means for receiving said read signal and an upper byte signal and outputting an upper byte selection signal.

4. A multiple use system according to claim 3, wherein said facsimile interface means comprises:

interface means for interfacing with said front end means;

interrupt control means connected to said interface means through a first address and data bus, for generating an interrupt signal according to priority order;

micro wire interface means connected to said interface means and said interrupt control means through said first address and data bus, for performing serial communication with said front end means;

bus interface means connected to said interface means, said interrupt control means and said micro wire interface means through said first address and data bus, for controlling said address and data bus in order to be interfaced with said CPU means.

5. A multiple use system according to claim 4 wherein said interface means comprises:

clock generation means for generating a clock signal;

sending data interface means connected to said clock generation means through a second address and data bus and including twelve 8 bit parallel/serial FIFO (First-In First-Out) registers for sending data;

receiving data interface means connected to said clock generation means and said sending data interface means through said second address and data bus and including twelve 8 bit parallel/serial FIFO registers for receiving data; and command interface means connected to said clock generation means, sending data interface means and said receiving data interface means through said second address and data bus, for controlling serial/parallel interface to enable read/write functions.

6. A multiple use system according to claim 1, wherein said cartridge memory control means comprises:

an inverter means for inverting a particular address signal;

first OR gate means for receiving the output of said inverter and a cartridge selection signal and outputting a logic summed signal; and second OR gate means for receiving said particular address signal and said cartridge selection signal and outputting a logic summed signal.

7. A multiple use system according to claim 6, wherein said data access arrangement means comprises:

a transformer means for impedance matching a transmission impedance with a telephone line;

relay means connected to said transformer means and driven by dial pulses outputted from said front end means, for relaying said dial pulses to said transformer means; and ring detection circuit means for detecting a ring signal from the telephone line and transmitting said ring signal to said facsimile interface means.

* * * * *